US012630043B2

(12) United States Patent
Lee

(10) Patent No.: US 12,630,043 B2
(45) Date of Patent: May 19, 2026

(54) VEHICLE AND METHOD OF CONTROLLING THE SAME

(71) Applicants:Hyundai Motor Company, Seoul (KR); Kia Corporation, Seoul (KR)

(72) Inventor: Hyejoo Lee, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 855 days.

(21) Appl. No.: 17/988,490

(22) Filed: Nov. 16, 2022

(65) Prior Publication Data

US 2023/0230062 A1 Jul. 20, 2023

(30) Foreign Application Priority Data

Jan. 17, 2022 (KR) ........................ 10-2022-0006535

(51) Int. Cl.
*B60L 53/66* (2019.01)
(52) U.S. Cl.
CPC .................................. *B60L 53/665* (2019.02)
(58) Field of Classification Search
CPC .... B60L 53/665; B60L 53/67; B60L 2250/16; B60L 53/65; B60L 2240/62
USPC ...................................... 320/109; 702/57–64
See application file for complete search history.

(56) References Cited

U.S. PATENT DOCUMENTS

2017/0140455 A1 5/2017 Tryha
2022/0069602 A1* 3/2022 Shin ...................... B60L 53/665

2022/0274491 A1* 9/2022 Kinomura ............... B60L 53/66
2022/0344957 A1* 10/2022 Fergadiotou .......... H02J 7/0071
2023/0182609 A1* 6/2023 Sohn ........................ B60L 53/68
320/109
2023/0382245 A1* 11/2023 Seong ..................... B60L 53/12

FOREIGN PATENT DOCUMENTS

CN 102110994 A 6/2011
CN 106355760 B 2/2019
KR 10-2012-0133481 A 12/2012
KR 10-2019-0096303 A 8/2019
KR 10-2020-0057518 A 5/2020
KR 10-2020-0106826 A 9/2020
KR 10-2021-0100545 A 8/2021

* cited by examiner

*Primary Examiner* — Richard V Muralidar

(74) *Attorney, Agent, or Firm* — MORGAN, LEWIS & BOCKIUS LLP

(57) ABSTRACT

A vehicle and a method of controlling the same includes a communicator configured to receive charging station information from an external server; a display; a sensor configured to obtain location information of a vehicle; and a controller connected to the communicator, the display and the sensor and including a processor configured to process the location information and the charging station information, wherein the controller is configured to, based on the location information and the charging station information being processed, identify whether the vehicle corresponds to an information providing condition, and in response to the vehicle corresponding to the information providing condition, control the display to display a unique identifier of the vehicle.

19 Claims, 8 Drawing Sheets

| CHARGING STATION | CHARGING COMPANY | PNC SUPPORT INFORMATION | PNC VEHICLE REGISTRATION INFORMATION | AUTOMATIC LINKAGE SUPPORT INFORMATION |
|---|---|---|---|---|
| | 401 | 402 | 403 | 404 |
| 12, GANGNAM-DAERO 1-GIL | A | O | X | O |
| E-MART GANGNAM BRANCH B2 | B | O | O | X |
| SHINSEGAE GANGNAM BRANCH | C | X | X | X |

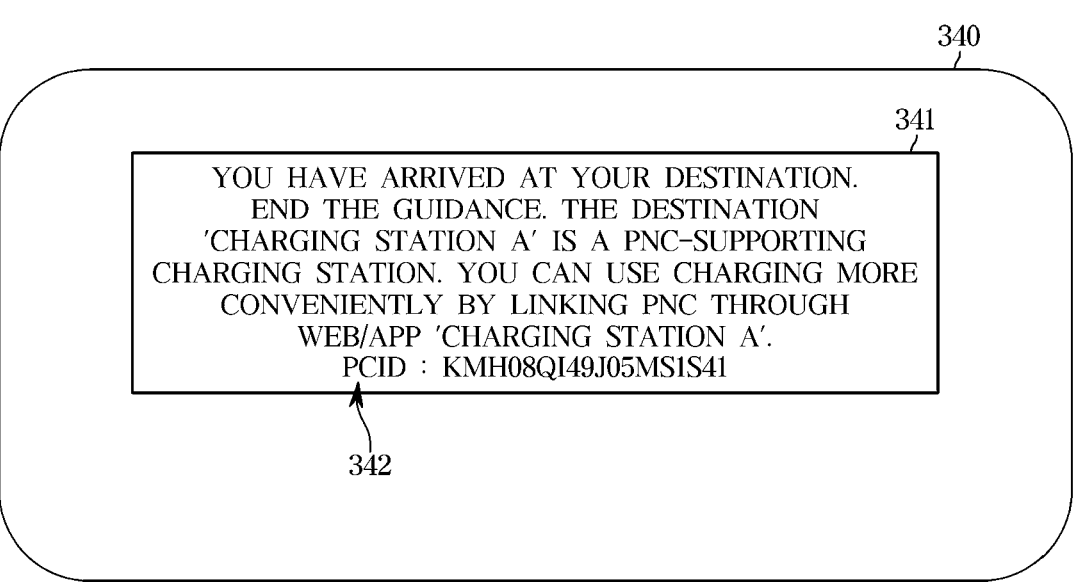

340

341

YOU HAVE ARRIVED AT YOUR DESTINATION.
END THE GUIDANCE. THE DESTINATION
'CHARGING STATION A' IS A PNC-SUPPORTING
CHARGING STATION. YOU CAN USE CHARGING MORE
CONVENIENTLY BY LINKING PNC THROUGH
WEB/APP 'CHARGING STATION A'.
PCID : KMH08QI49J05MS1S41

YOU HAVE ARRIVED AT YOUR DESTINATION.
END THE GUIDANCE.  THE DESTINATION
'CHARGING STATION A' IS A PNC-SUPPORTING
CHARGING STATION.  YOU CAN USE CHARGING MORE
CONVENIENTLY BY LINKING PNC THROUGH
WEB/APP 'CHARGING STATION A'.
PCID : KMH08QI49J05MS1S41

IT IS A CHARGING STATION THAT CAN
AUTOMATICALLY LINK PAYMENT INFORMATION.
WOULD YOU LIKE TO REGISTER?

343

| YES | NO |

FIG. 8

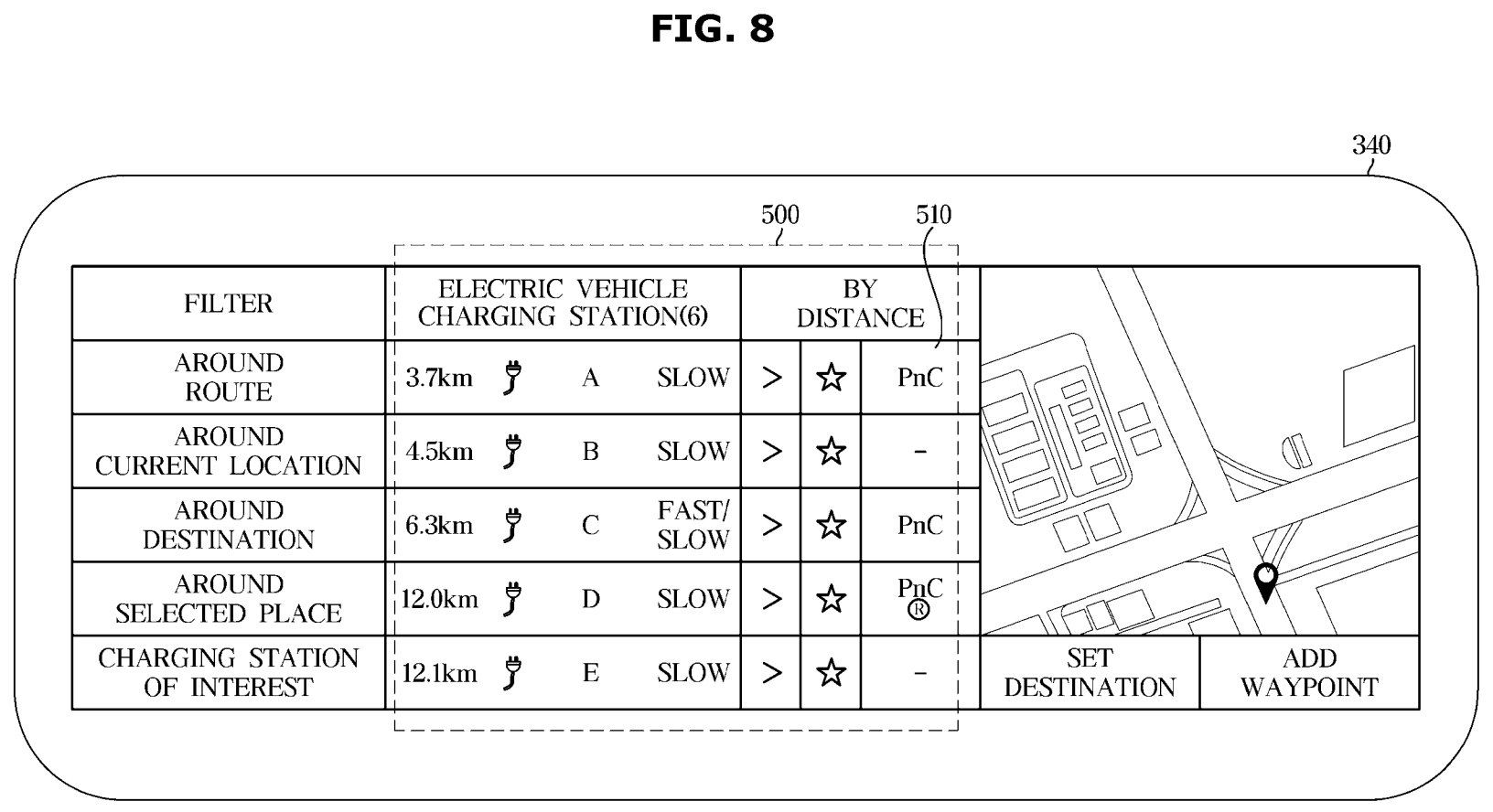

| FILTER | ELECTRIC VEHICLE CHARGING STATION(6) | | | BY DISTANCE | |
|---|---|---|---|---|---|
| AROUND ROUTE | 3.7km | A | SLOW | ☆ | PnC |
| AROUND CURRENT LOCATION | 4.5km | B | SLOW | ☆ | – |
| AROUND DESTINATION | 6.3km | C | FAST/ SLOW | ☆ | PnC |
| AROUND SELECTED PLACE | 12.0km | D | SLOW | ☆ | PnC Ⓡ |
| CHARGING STATION OF INTEREST | 12.1km | E | SLOW | ☆ | – |

| SET DESTINATION | ADD WAYPOINT |
|---|---|

340

510

500

VEHICLE AND METHOD OF CONTROLLING THE SAME

CROSS-REFERENCE TO RELATED APPLICATION

The present application claims priority to Korean Patent Application No. 10-2022-0006535, filed on Jan. 17, 2022, the entire contents of which is incorporated herein for all purposes by this reference.

BACKGROUND OF THE PRESENT DISCLOSURE

Field of the Present Disclosure

The present disclosure relates to a vehicle and a method of controlling the same, and more specifically, to a vehicle configured for providing convenience to a driver using a Plug and Charge (PnC) system and a method of controlling the same.

Description of Related Art

An electric vehicle charging system may be defined as a system that charges a battery mounted in an electric vehicle using power from a commercial power grid or an energy storage device. Such an electric vehicle charging system may have various forms in accordance with the type of an electric vehicle. For example, the electric vehicle charging system may include a conductive charging system using a cable or a non-contact type wireless power transmission system.

Recently, as a method of charging an electric vehicle, an automatic charging and billing system (Plug and Charge: PnC) has been provided that utilizes a power line communication (PLC) to perform customer authentication, charging, and billing at the same time. The PLC method may use a charging cable when charging an electric vehicle so that charging and communication are performed without installing a separate wired/wireless device, and based on a vehicle and payment information being registered by the driver in linkage with each other in a charging station server before charging, may obtain a unique identifier information of the vehicle received through the PLC to authenticate the vehicle and allow billing for the charging to be automatically performed.

However, in the conventional charging system, when the charging station does not provide a PnC system, there is no device and method capable of informing a driver whether the charging station provides a PnC system, and thus the driver has a hassle of installing a separate application.

Furthermore, even when a charging station provides a PnC system, because agents that build charging infrastructure are different and each agent has different power line communication software for obtaining unique identifier information of a vehicle, there is a hassle of separately entering unique identifier information of the vehicle to a charger, or searching for unique identifier information of the vehicle and registering the found unique identifier information together with payment information in a server of the agent that has built the charging station infrastructure.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for, when a condition in which information related to a charging station adopting a PnC system and unique identifier information of the vehicle are required, is satisfied, providing the driver with the unique identifier information of the vehicle and a method of controlling the same.

The technical objectives of the present disclosure are not limited to the above, and other objectives may become apparent to those of ordinary skill in the art based on the following descriptions.

According to an aspect of the present disclosure, there is provided a vehicle including: a communicator configured to receive charging station information from an external server; a display; a sensor configured to obtain location information of the vehicle; and a controller connected to the communicator, the display and the sensor and including a processor configured to process the location information and the charging station information, wherein the controller is configured to identify whether an information providing condition is satisfied based on the location information and the charging station information, and in response that the information providing condition is satisfied, control the display to display a unique identifier of the vehicle.

The controller may be configured to identify a list of charging stations in a predetermined distance from the vehicle based on the location information of the vehicle and the charging station information, and control the display to display the identified list of the charging stations.

The controller may be configured to identify whether the charging station supports an automatic charging and billing (Plug and Charge: PnC) system based on the unique identifier of the vehicle and the charging station information, and in response that the PnC is supported by the charging station, control the display to display the unique identifier of the vehicle.

The controller may be configured to, in response that the PnC system is supported by the charging station, identify whether the vehicle is registered in the charging station, and in response that the vehicle is not registered in the charging station, control the display to display the unique identifier of the vehicle.

The information providing condition may include at least one of: a distance between a location of the vehicle and a location of the charging station being less than a predetermined value, and a driver alight condition.

The vehicle may further include an inputter configured to input payment information, wherein the controller may be configured to control the communicator to transmit the payment information and the unique identifier of the vehicle to the external server, wherein the external server may register the vehicle based on the payment information and the unique identifier of the vehicle.

The sensor may be further configured to obtain battery information of the vehicle, wherein the controller may be configured to, identify a drivable distance of the vehicle based on the battery information, and identify a list of charging stations present in the identified drivable distance of the vehicle.

According to another aspect of the present disclosure, there is provided a method of controlling a vehicle, the method including: receiving charging station information from an external server; obtaining location information of the vehicle; identifying whether the vehicle corresponds to an information providing condition is satisfied based on the location information and the charging station information, and in response that the information providing condition is satisfied, displaying a unique identifier of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is a conceptual diagram illustrating an external configuration of a vehicle according to an exemplary embodiment of the present disclosure;

FIG. 5 is a conceptual diagram for describing charging station information to be received by a vehicle according to an exemplary embodiment of the present disclosure;

FIG. 6, FIG. 7, and FIG. 8 are conceptual views for describing a screen displayed by a display of a vehicle according to an exemplary embodiment of the present disclosure.

Figure 1:
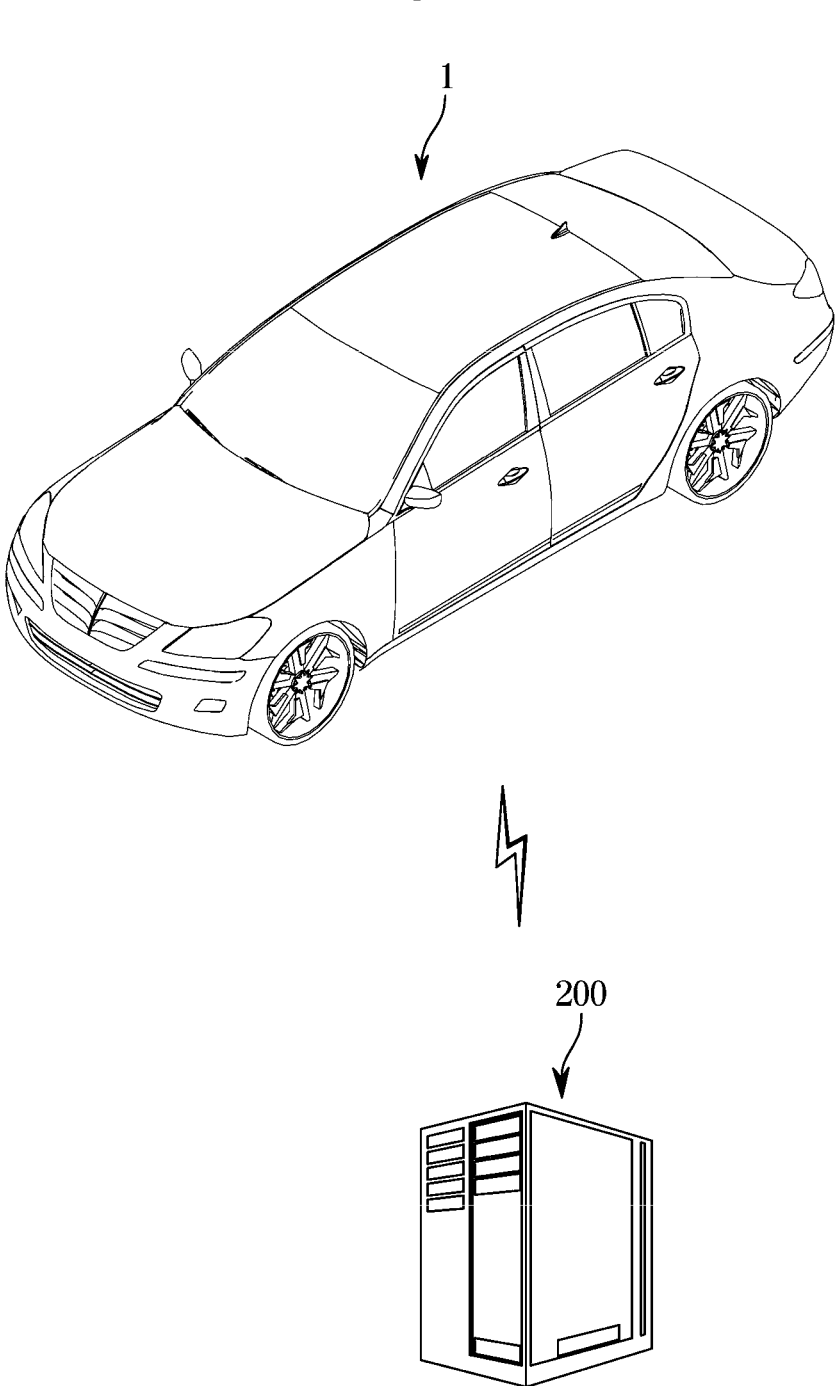
FIG. 1 is a conceptual diagram illustrating a vehicle system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like numerals refer to like elements throughout the specification. Not all elements of embodiments of the present ent disclosure will be described, and description of what are commonly known in the art or what overlap each other in the exemplary embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in the present specification, specify the presence of stated features, integers, steps, operations, elements, and/or components, but do not preclude the presence or addition of one or more other features, integers, steps, operations, elements, components, and/or groups thereof, unless the context clearly indicates otherwise.

As used herein, the singular forms "a," "an" and "the" are intended to include the plural forms as well, unless the context clearly indicates otherwise.

The terms, such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Reference numerals used for method steps are just used for convenience of explanation, but not to limit an order of the steps. Thus, unless the context clearly dictates otherwise, the written order may be practiced otherwise.

Although the terms "first," "second," "A," "B," etc. may be used to describe various components, the terms do not limit the corresponding components, but are used only for distinguishing one component from another component.

Hereinafter, an exemplary embodiment of a vehicle and a control method thereof according to an exemplary embodiment will be described in detail with reference to the accompanying drawings.

Recently, as a method of charging an electric vehicle, an automatic charging and billing system (Plug and Charge: PnC) has been provided that utilizes a power line communication (PLC) to perform customer authentication, charging, and billing at the same time. The PLC method may use a charging cable when charging an electric vehicle so that charging and communication are performed without installing a separate wired/wireless device, and based on a vehicle and payment information being registered by the driver in linkage with each other in a charging station server before charging, may obtain a unique identifier information of the vehicle received through the PLC to authenticate the vehicle and allow billing for the charging to be automatically performed.

However, in the conventional charging system, when the charging station does not provide a PnC system, there is no device and method configured for informing a driver whether the charging station provides a PnC system, and thus the driver has a hassle of installing a separate application.

Furthermore, even when a charging station provides a PnC system, because agents that build charging infrastructure are different and each agent has different power line communication software for obtaining unique identifier information of a vehicle, there is a hassle of separately entering unique identifier information of the vehicle to a charger, or searching for unique identifier information of the vehicle and registering the found unique identifier information together with payment information in a server of the agent that has built the charging station infrastructure.

The vehicle according to an exemplary embodiment of the present application is provided to solve such a limitation described above. However, the present disclosure is not limited thereto.

Meanwhile, for the sake of convenience of description, the automatic charging and billing system described above will be named and referred to as a Plug and Charge (PnC) system, but is not limited to the names. For example, the PnC system may be variously named, such as an automatic charging and billing system and/or a power line payment system and/or a payment system.

FIG. 1 is a conceptual diagram illustrating a vehicle system according to an exemplary embodiment of the present disclosure.

Referring to FIG. 1, a vehicle system may include a vehicle 1 and a server 200. However, because the vehicle system of FIG. 1 is merely an exemplary embodiment of the present disclosure, the present disclosure is not limited to the description with reference to FIG. 1, and may be configured differently from FIG. 1 according to various embodiments of the present disclosure. In another exemplary embodiment of the present disclosure, for example, the vehicle system may further include a user terminal.

The vehicle 1 may be an electric vehicle (a plug-in electric vehicle (PEV)). The vehicle 1 may not use petroleum fuel and an engine but may use an electric battery and an electric motor to rotate the motor with electricity stored in the battery to drive the vehicle 1. However, the present disclosure is not limited thereto. In another exemplary embodiment of the present disclosure, the vehicle 1 may be a hybrid vehicle using electricity and fuel. Accordingly, the vehicle 1 may further include a power communicator configured for inputting electrical energy and performing a power line communication (PLC).

The vehicle 1 and the server 200 may be connected to each other through a network. A network refers to a connection structure that allows information exchange between each node, such as a terminal and a server, and includes a local area network (LAN), a wide area network (WAN), the Internet (World Wide Web (WWW)), wired and wireless data communication networks, telephone networks, wired and wireless television networks, and the like. Examples of the wireless data communication network include 3G, 4G, 5G, 3rd Generation Partnership Project (3GPP), Long Term Evolution (LTE), Worldwide Interoperability for Microwave Access (WiMAX), Wi-Fi, Bluetooth communication, infrared communication, ultrasound communication, visible light communication (VLC), LiFi, and the like, but are not limited thereto.

The server 200 may process and store various data, and may transmit and/or receive the processed data. The server 200 may include a central server and a charging station server. Furthermore, the central server and the charging station server may be connected to each other through a network. Accordingly, the central server and the charging station server may transmit/receive data based on the network for data linkage between each other. The central server may be, for example, a connected vehicle service (CCS) server.

The central server and the charging station server may be the same or separately provided servers. Accordingly, the central server may request charging station information update to the charging station server, and may receive the charging station information from the charging station server according to the update request and update the received charging station information. Here, the charging station information may refer to metadata including information related to a charging station of an electric vehicle. As will be described in detail below, for example, the charging station information may include location information of the charging station of an electric vehicle, device type information of the charging station, company information of the charging station, PnC support information of the charging station, and payment information linked with a unique number of a vehicle, but is limited thereto.

Meanwhile, when the charging station server receives the charging station information from the charging station server and updates the received charging station information, it means that changes in the charging station server are reflected. In other words, when the driver registers a unique number of the vehicle and payment information in the charging station server so that the unique number of the vehicle and the payment information are linked with each other, the charging station server may transmit the information registered in linkage with each other to the central server so that the information is updated.

The central server may receive a request for the charging station information from the vehicle 1, and transmit the charging station information to the vehicle 1. Furthermore, the central server may, according to a vehicle registration request of the vehicle 1, transmit payment information and a unique identifier (provisioning certification identifier: PCID) of the vehicle 1 to the external server 200.

The charging station server may be a server operating at least one charging station. Accordingly, the charging station server may be provided as at least one charging station server, but is not limited thereto. For example, the charging station server may store a PCID of a vehicle registered by a user and payment information corresponding to the PCID, and generate charging station information related to a charging station. Accordingly, the charging station server may transmit the charging station information to the central server or may, according to an update request of the central server, transmit the charging station information to the central server. However, the present disclosure is not limited thereto.

Figure 2:
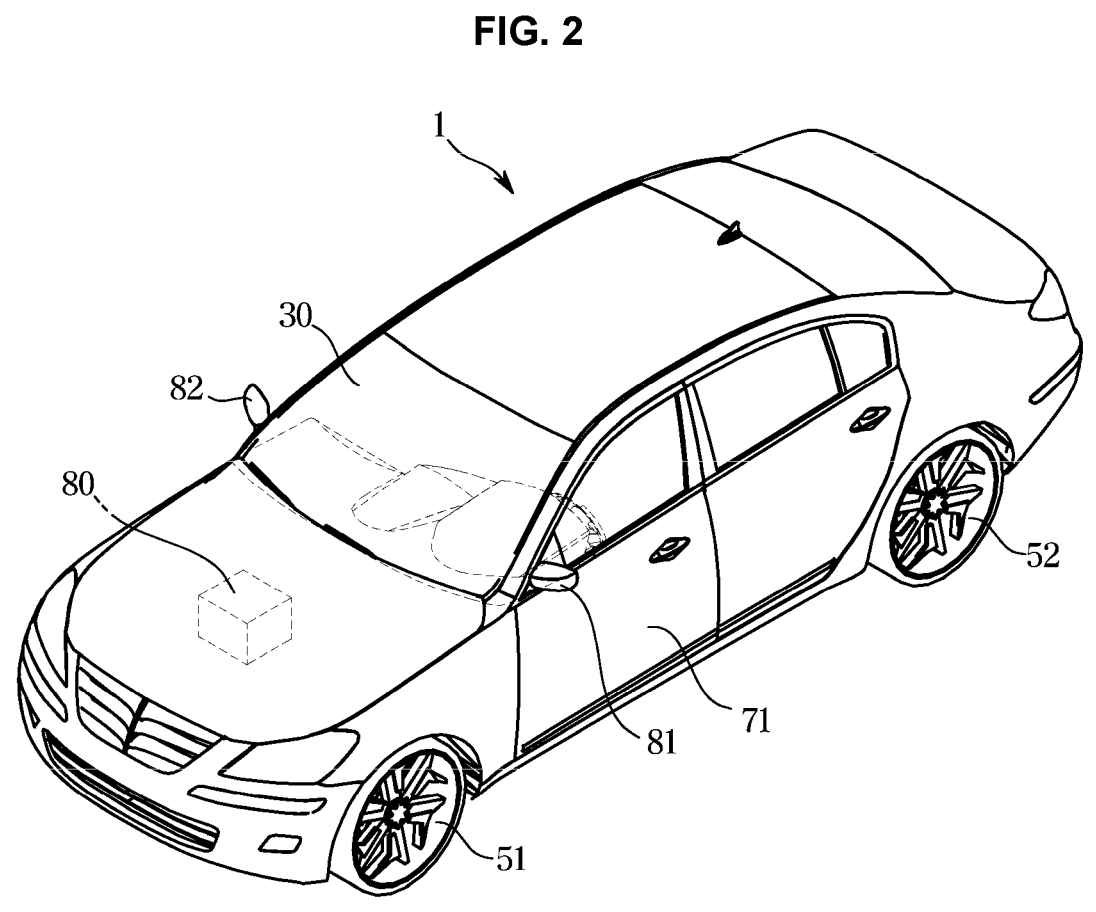
Figure 3:
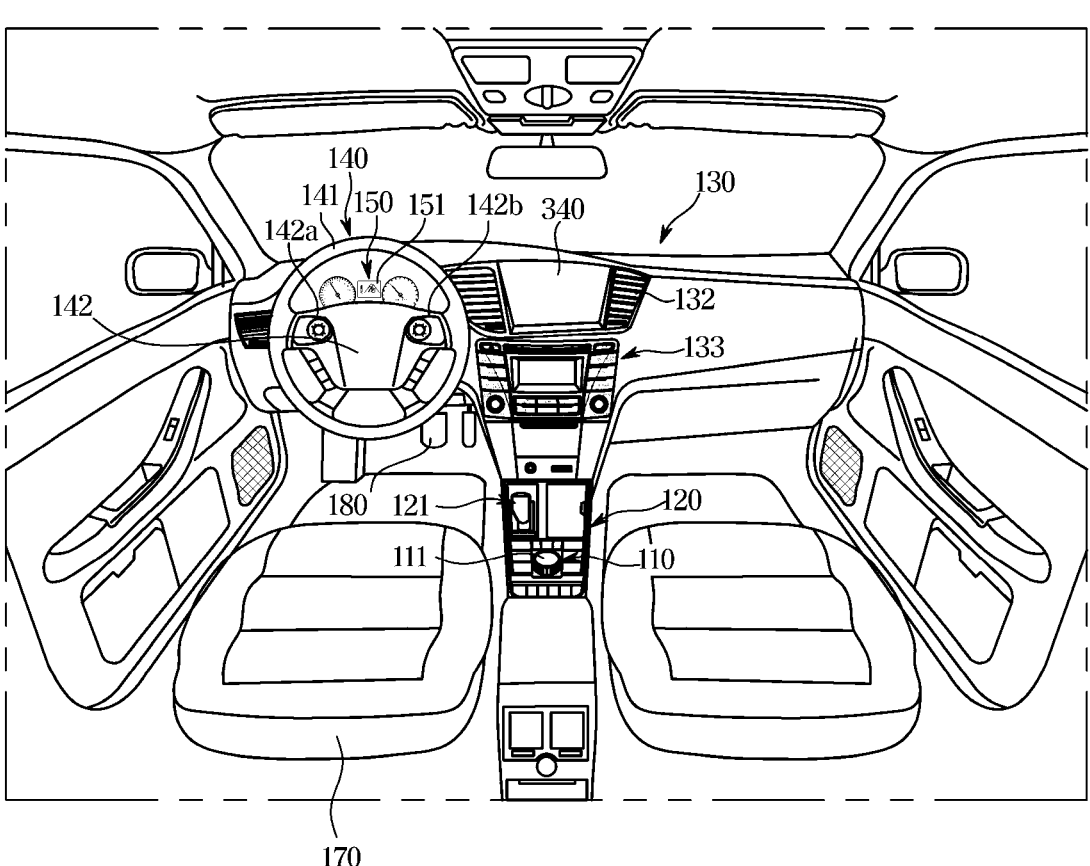
FIG. 3 is a conceptual diagram illustrating an internal configuration of a vehicle according to an exemplary embodiment of the present disclosure.

FIG. 2 is a conceptual diagram illustrating an external configuration of a vehicle according to an exemplary embodiment of the present disclosure, and FIG. 3 is a conceptual diagram illustrating an internal configuration of a vehicle according to an exemplary embodiment of the present disclosure.

Referring to FIG. 2, the vehicle 1 may include a body including an exterior of the vehicle 1 and a frame of the vehicle 1 carrying people and/or cargo (for example, an engine compartment, a trunk, a bumper, a roof, a side plate, a floor, etc.,) and a chassis including devices required for the vehicle 1 to travel for example, an engine, a power transmission device, a steering device, a brake, and the like.

Meanwhile, general descriptions of the body and chassis of the vehicle 1 will be omitted.

Doors 71 are rotatably provided on the left and right sides of the vehicle 1 to allow a driver to board the interior of the vehicle when the doors 71 are opened, and shields the interior of the vehicle 1 from the outside thereof when the doors 71 are closed.

The vehicle 1 may include a dashboard in which a gearbox 120, a center fascia 130, a steering wheel 140, and an instrument panel 150 are provided as shown in FIG. 3.

A gear lever 121 for shifting the vehicle 1 may be provided in the gearbox 120. Furthermore, as shown in the drawing, the gearbox may be provided with an input device 110 including a dial manipulator 111 and various buttons that allow a user to control functions of multimedia devices including a navigation device or an audio device 133 or control performance of major functions of the vehicle 1.

The center fascia 130 may be provided with an air conditioner 132, an audio device 133, and a navigation device. Here, the navigation device may be a navigation device embedded in a display 340 or included in a controller to be described below.

For example, a navigation device may be provided in the center fascia 130. The navigation device may be formed to be embedded in the center fascia 130 of the vehicle 1. According to an exemplary embodiment of the present disclosure, an inputter for controlling the navigation device may be provided in the center fascia. According to an exemplary embodiment of the present disclosure, the inputter of the navigation device may be provided at a location other than the center fascia. For example, the inputter of the navigation device may be formed in the vicinity of the display 340. Furthermore, as an exemplary embodiment of the present disclosure, the inputter of the navigation device may be provided in the gear box 120 or the like.

In another exemplary embodiment of the present disclosure, the navigation device may be implemented as a head-up display that allows route guidance information including a travelling route to be displayed on a windshield. The head-up display may be implemented in a vehicle together with a navigation device embedded in the center fascia of the vehicle 1. In another exemplary embodiment of the present disclosure, a navigation function provided on a mobile terminal including a communication function, such as a smart phone, may be used as the navigation device according to the included embodiment.

On the other hand, the navigation device may be built, for example, in the display 340, and may be formed as one body. However, the present disclosure is not limited thereto.

Furthermore, various instrument panels 150 may be provided on the dashboard to display the travelling speed of the vehicle, the number of engine revolutions or the remaining fuel amount. The instrument panel 150 may include an instrument panel display 340 for displaying information related to vehicle state, information related to vehicle travelling, information related to manipulation of a multimedia device, and the like.

Meanwhile, the display 340 of the vehicle 1 displays a travelling route to a destination input by the user. In general, route information provided by the navigation device may include a distance to a charging station, location information of a charging station, and the like. However, in the conventional navigation device, even when the driver sets a charging station as a destination, whether the charging station supports a PnC system may not be provided. Furthermore, when the charging station supports a PnC system but and the vehicle's PCID and/or payment information are not linked to the charging station server, the driver has a hassle of searching for the PCID of the vehicle with the need to linkage (registration).

The exemplary embodiment included herein provides a vehicle and a method of controlling the same that are configured for providing driver with information related to whether a charging station around the vehicle 1 supports PnC, information related to a registration state/and information related to whether automatic registration is allowable, and when the vehicle 1 corresponds to an information provision condition in which the driver requires a PCID, providing a PCID of the vehicle 1 through the display 340. Details thereof will be described with reference to FIG. 4, FIG. 5, FIG. 6, FIG. 7, and FIG. 8.

Figure 4:
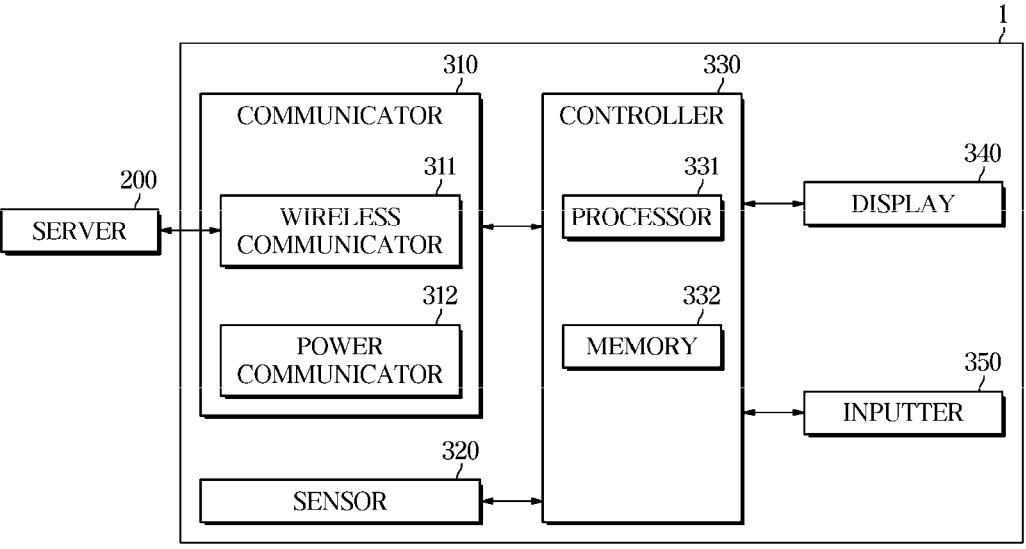
FIG. 4 is a block diagram illustrating a configuration of a vehicle according to an exemplary embodiment of the present disclosure.

FIG. 4 is a block diagram illustrating a configuration of a vehicle 1 according to an exemplary embodiment of the present disclosure.

FIG. 5 is a conceptual diagram for describing charging station information to be received by a vehicle 1 according to an exemplary embodiment of the present disclosure.

Referring to FIG. 4, the vehicle 1 according to an exemplary embodiment of the present application may include a communicator 310, a sensor 320, a controller 330, a display 340, and an inputter 350.

The communicator 310 may include a wireless communicator 311 and a power communicator 312. Here, the communicator 310 may be connected to the controller 330 and the external server 200, a global positioning system (GPS) satellite, and/or a user terminal in a wired and/or wireless manner. Various types of communication, such as Wireless Fidelity (Wi-Fi), Bluetooth, Zigbee communication may be used as the wireless communication.

Accordingly, the wireless communicator 311 may receive charging station information, which is information related to a charging station for charging the vehicle 1, from the external server 200 and may transmit a PCID and/or payment information of the vehicle 1 to the external server 200. That is, the wireless communicator 311 may be allowed for data linkage with the external server 200 to transmit and receive real-time data in which data linkage is possible.

Referring to FIG. 5, the wireless communicator 311 receives charging station information 400 from that the server 200, the charging station information 400 including locations 400a, 400b, and 400c of charging stations, company information 401 of companies that operate the charging stations, PnC support information (information whether PnC is supported) 402 of the corresponding charging stations, PnC vehicle registration (linkage) information (information whether PnC vehicle is registered) 403, and vehicle automatic linkage (registration) support information (information whether vehicle automatic linkage is supported) 404 of the corresponding charging stations. Here, the PnC vehicle registration (linkage) information 403 may be information provided when the corresponding charging station supports PnC.

In other words, the PnC vehicle registration (linkage) information 403 may be information indicating whether there is a need for the driver to link (register) a PCID and/or payment information of the vehicle again depending on whether the PCID and/or payment information of the vehicle 1 has been registered (linked) to the charging station server. Meanwhile, the payment information may refer to a payment method including a credit card, a check card, and the like for payment and authentication information.

On the other hand, the automatic linkage support information 404 may refer to information indicating whether a PCID of the vehicle 1 and payment of the driver are automatically registered (linked) to the charging station server when the vehicle 1 transmits the PCID of the vehicle 1 and the payment information of the driver to the external server 200. That is, the automatic linkage support information 404 may refer to a state in which data linkage between the charging station server and the central server is possible.

Accordingly, the wireless communicator 311 may receive the charging station information 400 from the external server 200 and transmit the received charging station information 400 to the controller 330.

The wireless communicator 311 may receive signals from a plurality of Global Positioning System (GPS) satellites located above the earth to determine the current location of the vehicle. To the present end, the communicator 310 may include a circuit board and/or a module required for determining the current location of the vehicle.

The power communicator 312 may perform power line communication (PLC) with a charging terminal of a charger. Here, PLC refers to communication for transmitting and receiving speeches and/or data using a power supply line. Accordingly, the power communicator 312 may receive power from the charging terminal, and may provide the charger with a PCID of the vehicle 1.

However, when agents producing the vehicle 1 and agents producing the charging stations diversify, different types of software and/or hardware are used, and the charging terminal has a difficulty in reading the PCID of the vehicle 1 through the power communicator 312. In the instant case, the vehicle 1 is implemented to be registered (linked) to the charging station server using the PCID of the vehicle 1 so that the driver may use the charging station to which a PnC system is applied. To the present end, the vehicle 1 according to the exemplary embodiment of the present application may automatically identify a condition in which the driver requires the PCID of the vehicle 1 and provide the driver with the PCID of the vehicle 1.

The sensor 320 may include various sensors for detecting obstacles around the vehicle 1 to assist the driver in recognizing the surrounding situation of the vehicle 1, or identifying location information of the vehicle 1.

For example, the sensor 320 may include a camera configured for obtaining an image of the front of the vehicle, a rear camera configured for obtaining an image of the rear of the vehicle, a side camera configured for obtaining an image of the side of the vehicle, a distance sensor configured for detecting a distance from an object in front of the vehicle, a Global Positioning System (GPS) device configured for obtaining information required for location recognition of the subject vehicle, a gyro sensor, a geomagnetic sensor, an acceleration sensor, an inertial sensor, a battery sensor configured for obtaining battery information of the vehicle, and the like. However, the present disclosure is not limited thereto.

Here, the GPS device included in the sensor 320 may be provided to obtain the current location information of the vehicle 1 through wireless communication with the external server 200 and/or a GPS satellite. Furthermore, the battery sensor included in the sensor 320 may obtain battery information including a current remaining battery capacity of the vehicle 1, a voltage signal, a current signal, and/or a temperature signal, of the battery.

The controller 330 may include a processor 331 and a memory 332.

The controller 330 may be electrically interconnected to the communicator 310, the sensor 320, the display 340, and the inputter 350 of the vehicle 1. For example, the communicator 310 may be connected to the controller 330 through vehicle communication network NT, or may be connected to the controller 330 through a hard wire. Here, being electrically interconnected may refer to a state in which mutual data communication is possible or mutual power transmission/reception is possible. For example, the electric devices 310, 320, 330, 340, and 350 included in the vehicle 1 may exchange data through Ethernet, Media Oriented Systems Transport (MOST), Flexray, Controller Area Network (CAN), Local Interconnect Network (LIN), etc.

The processor 331 may receive data of a 3D navigation map of the nearby area of the vehicle 1 from the memory 332 based on the location information of the vehicle 1. The location of the vehicle 1 may be determined, for example, by the sensor 320, such as a GPS or other location recognition system.

Because the data of the navigation map may include information related to the vicinity of the vehicle, the user may identify how the user or a moving object (vehicle) may move to reach a target destination. Here, the information related to the vicinity of the vehicle may be, for example, a map section representing a nearby area within a predetermined range around a view position.

Meanwhile, the processor 331 may, in response to a manipulation of the inputter 350 by the driver, provide navigation information based on the manipulation. For example, the driver may input an area that the driver desires to reach, to receive guidance on the fastest route from the current location to the destination, and may receive map information and various information for a specific location. In other words, the processor 331 may include a processor of an audio video navigation (AVN) device or navigation device, and may be itself. However, the present disclosure is not limited thereto.

The processor 331 may process the charging station information 400 received from the external server 200 and the location information of the vehicle 1 received from the sensor 320. Accordingly, the processor 331 may identify whether the information provision condition is satisfied. The information provision condition may refer to a condition for preventing the driver from providing a PCID while driving the vehicle 1 due to an inconvenience and/or an accident during drive.

The information provision condition may include at least one of: a driver alight condition including a case in which the ignition of the vehicle 1 is turned off, a case in which the doors 71 and 72 of the vehicle 1 are opened, or a case in which the seat belt of the vehicle 1 is released; and a case in which the distance between the location of the vehicle 1 and the location of the charge station set as a destination by the driver is less than a preset value. However, the information provision condition is not limited thereto.

Accordingly, when the vehicle 1 satisfies the information provision condition, the processor 331 may control the display 340 to display the PCID (PCID) of the vehicle 1.

Meanwhile, the processor 331 may provide a vehicle charging management system (VCMS). That is, the processor 331 may include at least one processor for managing a charging-related function in the vehicle 1.

For example, the processor 331 may receive a PCID received from a processor executing a VCMS program in a form of a HEX value, and process the received HEX value. The processor 331 may, based on the processed HEX value, convert the HEX value into an ASCII code for the PCID to be displayed on the display 340. Accordingly, the processor 331 may output a control signal for controlling the display 340 to display the PCID of the vehicle 1.

The processor 331 may, based on the location information of the vehicle 1 obtained from the sensor 320 and the charging station information 400 being processed, identify a list of charging stations within a predetermined distance of the vehicle 1, and control the display 340 to display the list of the charging stations. Furthermore, the processor 331 may control the display 340 to display information related to a PnC support and/or PnC vehicle registration of at least one charging station based on the charging station information 400 being processed.

Meanwhile, the processor 331 may identify the PnC system support information 402 of the charging station set by the driver based on the PCID of the vehicle 1 and the charging station information 400 being processed. Accordingly, when the charging station set by the driver supports a PnC system, the processor 331 may control the display 340 to display the PCID of the vehicle 1. On the other hand, when the charging station set by the driver does not support a PnC system, the processor 331 may control the display 340 to provide the driver with a notification indicating that the corresponding charging station does not support a PnC system. However, the present disclosure is not limited thereto.

Furthermore, the processor 331 may, based on identifying that the charging station set by the driver as the destination supports a PnC system, identify whether the vehicle 1 is linked (registered) to the charging station when the charging station supports the PnC system (403). When the PCID and/or payment information of the vehicle 1 is registered in advance in the charging station by the driver, it is considered a case in which separate PCID information is not required. For this, the processor 331 may identify whether the vehicle 1 is linked (registered) to the charging station server.

In another exemplary embodiment of the present disclosure, the processor 331 may, when the charging station set by the driver as a destination supports a PnC system, but the vehicle 1 is not registered (linked) to the charging station, control the display 340 to display a PCID of the vehicle 1. While controlling the display 340 to display the PCID of the vehicle 1, the processor 331 may provide information required for registration (linkage) of the vehicle 1. For example, an Internet address and/or application information connected to the server of the corresponding charging station may be provided as a QR code.

Meanwhile, the processor 331 may, based on the charging station information 400 being processed, identify the automatic linkage support information 404 of the charging station set by the driver as a destination. Accordingly, when a charging station input by the driver as a destination provides a PnC system, payment information of the vehicle 1 is not registered in the PnC system, and the corresponding charging station server supports automatic linkage, the processor 331 may register (link) the vehicle 1 to the corresponding charging station based on payment information of the driver obtained through the inputter 350 and a PCID of the vehicle 1.

In more detail, the processor 331 may control the communicator 310 to transmit payment information of the driver obtained through the inputter 350 and a PCID of the vehicle 1 to the external server 200. Accordingly, the external server 200 may link (register) the vehicle 1 to the charging station based on the payment information and the PCID of the vehicle 1 obtained from the communicator 310. Accordingly, the driver may more easily use a PnC system at a charging station in which the vehicle is not registered (linked).

Meanwhile, the processor 331 may process battery information of the vehicle 1 obtained from the sensor 320. The processing of the battery information may include identifying a driving distance of the vehicle 1 based on the driving habit of the driver, according to the remaining capacity of the battery. To the present end, conventional technologies of identifying vehicle travelable distance and/or conventional technologies of identifying vehicle travelable distance to be developed in the future may be used.

Accordingly, the processor 331 may identify a list of charging stations present within the travelable range of the vehicle 1 based on the identified travelable distance and the charging station information 400 of the vehicle 1 being processed.

The memory 332 stores map information related to navigation and various types of information. Among pieces of information received from the communicator 310, required information may be stored in the memory, for example, in a form of a database. For example, the memory 332 may store data regarding charging station information and/or a 3D navigation map.

The memory 332 may store a program for performing the above-described operations and operations to be described below, and the processor 331 may execute the stored program. When the memory 332 and the processor 331 are provided in a plurality of units thereof, the plurality of memories 332 and the plurality of processors 331 may be integrated into one chip or may be provided in physically separate locations. The memory 332 may include a volatile memory, such as a static random access memory (S-RAM), a dynamic random access memory (D-RAM), and the like to temporarily memorize data. Furthermore, the memory 332 may include a nonvolatile memory device, such as a read only memory (ROM), an erasable programmable ROM (EPROM), an electrically erasable programmable ROM (EEPROM), and the like to store a control program and control data for a long time period. The processor 331 may include various logic circuits and arithmetic circuits, process data according to a program provided from the memory 332, and generate a control signal according to a result of processing.

The display 340 may be located in the center fascia 130 which is the central area of the dashboard. Alternatively, in another exemplary embodiment of the present disclosure, the display 340 may include a display of a mobile terminal, such as a smart phone that provides a navigation function. The display 340 described above according to the included embodiment may display an image obtained by the front camera as a background using augmented reality technology, and display images indicating travelling route-related information on the displayed background image in an overlay manner. Such a display 340 may employs a light emitting diode (LED) and an organic light emitting diode (OLED) configured for self-emission or a liquid crystal display including a separate light emitting source.

Furthermore, the display 340 may employ a touch screen panel (TSP) that receives a control command from a user and displays operation information corresponding to the received control command. The touch screen panel includes a display that displays operation information and control commands which may be input by the user, a touch panel that detects coordinates touched by a part of the user's body, and a touch screen controller configured for determining the input control command based on the coordinates of a touch detected by the touch panel. The touch screen controller may recognize a control command input by the user by comparing the coordinates of a user's touch detected through the touch panel with the coordinates of the control command displayed through the display. In the instant case, the inputter 350 may not be separately required.

The inputter 350 generally receives a command of a driver and transmits the command to the controller 330. The driver may directly input a command to the controller 330 or may input a command by a speech through a speech recognition function. Accordingly, the inputter 350 may include a touch screen including a touch panel or a microphone and a speech receiving device required for speech recognition to directly receive a user's command.

The inputter 350 may detect a touch manipulation applied to the touch panel, and generate an electrical signal based on the detected touch manipulation and output the generated electrical signal. The touch manipulation may be performed by a touch device, for example, a finger, a hand, or a touch pen. A touch screen portion may, upon detecting a touch device, allow a touch manipulation to be detected in all areas in which a screen is displayed.

Furthermore, the input method through the touch screen may include a resistive touch screen method that detects a user's touch manipulation, a capacitive touch screen method that detects a user's touch manipulation using a capacitive coupling effect, an optical touch screen method using infrared rays, an ultrasonic touch screen method that utilizes ultrasonic waves. The input method through the touch screen is not limited thereto and may be provided in various types.

Furthermore, the user may manipulate the controller 330 by a speech through a speech recognition function. Therefore, the user may manipulate the vehicle 1 by a speech without directly inputting a command while driving, so that the vehicle may be safely operated.

FIG. 6, FIG. 7, and FIG. 8 are conceptual views for describing a screen displayed by a display 340 of a vehicle 1 according to an exemplary embodiment of the present disclosure.

Referring to FIG. 6, the controller 330 may, based on location information of the vehicle 1 and charging station information 400 being processed, identify an information provision condition of the vehicle 1, and according to the identified information provision condition, provide a message 341 and/or a PCID 342.

For example, in a case in which the driver sets a charging station as a destination through the inputter 350, when the charging station supports a PnC system but the vehicle is not registered, and automatic linkage is not supported, the controller 330 may control the display 340 to display a message 341 including a corresponding guidance and a PCID 342 of the vehicle 1 based on the charging station information 400 and the location information of the vehicle 1 being processed. In the instant case, the message 341 is not limited to that shown in the drawing, and may be provided in a new area separately as a pop-up.

In other words, the controller 330 may control the display 340 to display the message 341 in an area different from an area in which the navigation information is displayed. However, the present disclosure is not limited thereto, and in another exemplary embodiment of the present disclosure, the controller 330 may output a control signal so that the message 341 is displayed on the heads-up display.

Referring to FIG. 7, when it is identified that the charging station set by the driver as a destination supports a PnC system and the vehicle is not registered, but automatic linkage is supported, the controller 330 may control the display 340 to display an automatic registration message 343.

Accordingly, when the driver performs an automatic linkage operation through the display touch panel, the controller 330 may transmit payment information input in advance through the inputter 350 and a PCID 342 of the vehicle 342 to the external server 200 so that the external server 300 may perform registration (linkage) on the vehicle 1. However, the present disclosure is not limited thereto.

Furthermore, the controller 330 may transmit the payment information and the PCID 342 of the vehicle 1 to the external server 200 based on user setting information input in advance through the inputter 350. Here, the user setting information may refer to setting information for requesting automatic registration without displaying the automatic registration message 343 asking whether to perform automatic linkage when the vehicle 1 corresponds to the PCID provision condition described above.

Referring to FIG. 8, the controller 330 may, based the location information of the vehicle 1 and the charging station information 400 being processed, identify a charging station list 500 and based on the charging station list 500, control the display 340 to provide remaining distances to each charging station, charging speed information, and/or PnC-related information 510. Here, the PnC-related information 510 may include whether the corresponding charging station provides a PnC system, whether the vehicle 1 is registered in the charging station, and/or whether automatic linkage of the vehicle 1 is possible. However, the present disclosure is not limited thereto. Furthermore, the controller 330 may control the display 340 to display the charging station list 500 so that the closest charging station to the vehicle 1 is provided the first. Furthermore, when the driver inputs a destination through the inputter 350, the controller 330 may control the display 340 to display a list of charging stations around a route to the destination or display a list of charging stations of interest stored in advance by the driver.

Accordingly, when the driver inputs a charging station suitable for charging the vehicle 1 through the inputter 350 based on the charging station list 500 displayed on the display 340, the controller 330 may control the display 340 to display route information based on the charging station input through the inputter 350.

To summarize, the controller 330 may, based on the charging station information received from the external server 200 and the location information of the vehicle 1 being processed, identify whether the information provision condition is satisfied. That is, the controller 330 may identify whether the vehicle 1 corresponds to the information provision condition based on the distance between the location of the vehicle 1 and the location of the charging station included in the charging station information being less than a predetermined value. Accordingly, the controller 330 may, in response to identifying that the vehicle 1 corresponds to the information provision condition, control the display 340 to display the PCID of the vehicle 1.

Meanwhile, the predetermined value may refer to a distance for determining that the vehicle 1 has arrived at the charging station or parked. However, the present disclosure is not limited thereto, and the predetermined value may be a value set experimentally and/or empirically and/or a set value input by a driver.

Furthermore, the controller 330 may, based on the PCID of the vehicle 1 and the charging station information being processed, identify whether a charging station located away from the vehicle 1 at a distance less than the predetermined value supports a PnC system. Accordingly, in response to identifying that the charging station supports a PnC system, the controller 330 may control the display 340 to display the PCID of the vehicle 1. When the charging station does not support a PnC system corresponds to a case that a PCID of the vehicle 1 is not required.

In another exemplary embodiment of the present disclosure, in response to identifying that the charging station information does not include information related to whether the charging station supports a PnC system, the controller 330 may, upon identifying that the vehicle 1 corresponds to the information provision condition, control the display 340 to display the PCID of the vehicle 1. This is to provide the driver's convenience by preventing a gap in information which may occur due to a transmission/reception error of the network and/or a lack of updating of charging station information.

Figure 9:
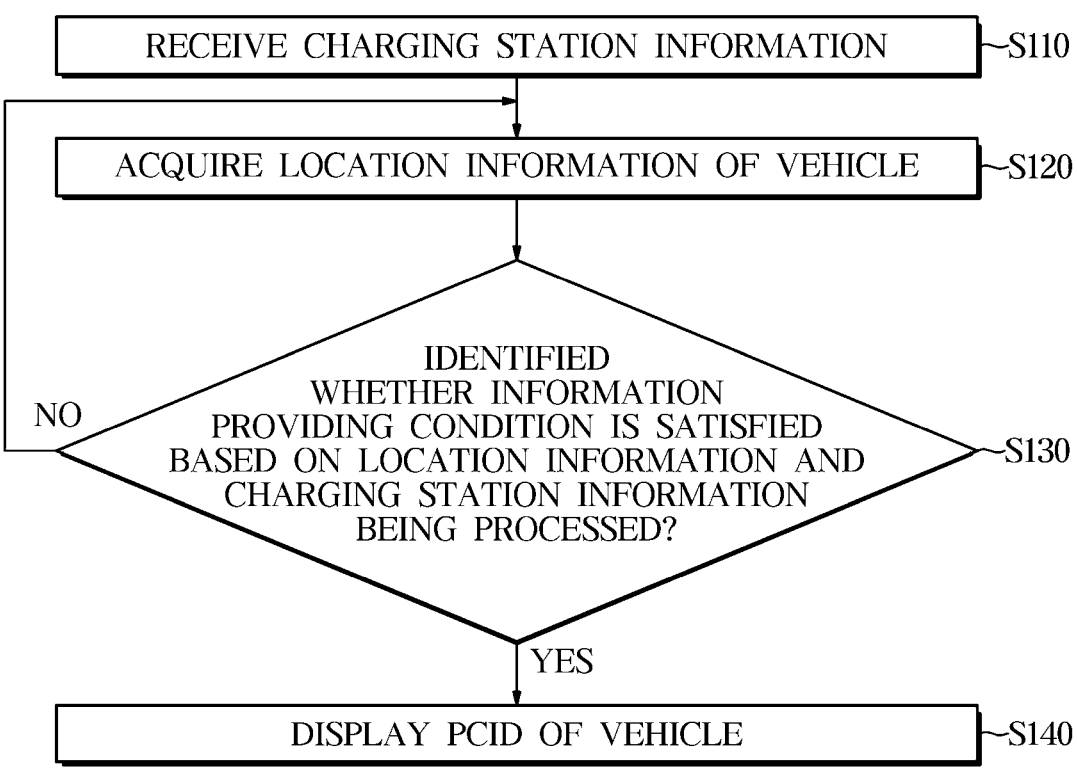
FIG. 9 is a flowchart illustrating a method of controlling a vehicle according to an exemplary embodiment of the present disclosure.

FIG. 9 is a flowchart illustrating a method of controlling a vehicle 1 according to an exemplary embodiment of the present disclosure.

The method of controlling the vehicle shown in FIG. 9 may be performed by the vehicle 1 described above. Accordingly, even when omitted below, the description of the vehicle 1 may be equally applied to the description of the method of controlling the vehicle.

Referring to FIG. 9, the vehicle 1 may receive charging station information (S110).

Furthermore, the vehicle 1 may obtain location information of the vehicle 1 (S120).

Furthermore, the vehicle 1 may, based on the location information and the charging station information being processed, identify whether the information provision condition is satisfied (S130).

Furthermore, the vehicle 1 may, in response to identifying that the information provision condition is not satisfied, obtain location information of the vehicle 1 (S130).

Furthermore, the vehicle 1 may, in response to identifying that the information provision condition is satisfied, control the display to display the PCID of the vehicle 1 (S140).

Meanwhile, the disclosed exemplary embodiments of the present disclosure may be embodied in a form of a recording medium storing instructions executable by a computer. The instructions may be stored in a form of program code, and when executed by a processor, may generate a program module to perform the operations of the disclosed exemplary embodiments of the present disclosure. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the vehicle and the method of controlling the same according to an exemplary embodiment can, when a condition in which information related to a charging station adopting a PnC system and unique identifier information of the vehicle are required, is satisfied, provide the driver with the unique identifier information of the vehicle.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
   a communicator configured to receive charging station information from an external server;
   a display;
   a sensor configured to obtain location information of the vehicle; and
   a controller operatively connected to the communicator, the display and the sensor and including a processor configured to process the location information and the charging station information,
   wherein the controller is configured to,
   identify whether an information providing condition is satisfied based on the location information and the charging station information, and
   in response that the information providing condition is satisfied, control the display to display a unique identifier of the vehicle.

2. The vehicle of claim 1, wherein the controller is further configured to:
   identify a list of charging stations in a predetermined distance from the vehicle based on the location information of the vehicle and the charging station information, and
   control the display to display the identified list of the charging stations.

3. The vehicle of claim 2, wherein the controller is further configured to:
   identify whether the charging stations support an automatic charging and billing (Plug and Charge: PnC) system based on the unique identifier of the vehicle and the charging station information, and
   in response that the PnC is supported by the charging stations, control the display to display the unique identifier of the vehicle.

4. The vehicle of claim 3, wherein the controller is further configured to:
   in response that the PnC system is supported by the charging stations, identify whether the vehicle is registered in the charging stations, and
   in response that the vehicle is not registered in the charging stations, control the display to display the unique identifier of the vehicle.

5. The vehicle of claim 4, wherein the information providing condition includes at least one of a distance between a location of the vehicle and a location of the charging stations being less than a predetermined value, and a driver alight condition.

6. The vehicle of claim 1, further including:
   an inputter configured to input payment information,
   wherein the controller is further configured to control the communicator to transmit the payment information received from the inputter and the unique identifier of the vehicle to the external server, and
   wherein the external server registers the vehicle based on the payment information and the unique identifier of the vehicle.

7. The vehicle of claim 1, wherein the sensor is further configured to obtain battery information of the vehicle, and wherein the controller is further configured to:

identify a drivable distance of the vehicle based on the battery information, and identify a list of charging stations present in the identified drivable distance of the vehicle.

8. A method of controlling a vehicle, the method including:

receiving charging station information from an external server;

obtaining, by a sensor, location information of the vehicle; and identifying, by a controller operatively connected to the sensor, whether an information providing condition is satisfied based on the location information and the charging station information, and in response that the information providing condition is satisfied, displaying, by the controller, a unique identifier of the vehicle through a display.

9. The method of claim 8, wherein the identifying of whether the information providing condition is satisfied includes identifying a list of charging stations in a predetermined distance from the vehicle based on the location information and the charging station information, and wherein the displaying of the unique identifier of the vehicle includes displaying the identified list of the charging stations in the display.

10. The method of claim 9, wherein the identifying of whether the information providing condition is satisfied includes: further identifying whether the charging stations support an automatic charging and billing (Plug and Charge: PnC) system based on the unique identifier of the vehicle and the charging station information, and wherein the displaying of the unique identifier of the vehicle includes: in response that the PnC is supported by the charging stations, displaying the unique identifier of the vehicle.

11. The method of claim 10, wherein the identifying of whether the information providing condition is satisfied includes:

in response that the PnC system is supported by the charging stations, identifying whether the vehicle is registered in the charging stations, and wherein the displaying of the unique identifier of the vehicle includes:

in response that the vehicle is not registered in the charging stations, displaying the unique identifier of the vehicle.

12. The method of claim 11, wherein the information providing condition includes at least one of a distance between a location of the vehicle and a location of the charging stations being less than a predetermined value, and a driver alight condition.

13. The method of claim 8, further including:

receiving, by the controller, payment information;

transmitting, by the controller, the payment information and the unique identifier of the vehicle to the external server; and registering, by the external server, the vehicle based on the payment information and the unique identifier of the vehicle.

14. The method of claim 8, further including:

obtaining, by the sensor, battery information of the vehicle, wherein the identifying of whether the information providing condition is satisfied includes:

identifying a drivable distance of the vehicle based on the battery information; and identifying a list of charging stations present in the identified drivable distance of the vehicle.

15. A system of providing a driver with a unique identifier information of a vehicle, the system comprising:

an external server; and the vehicle including:

a communicator configured to receive charging station information from the external server;

a display;

a sensor configured to obtain location information of the vehicle; and a controller operatively connected to the communicator, the display and the sensor and including a processor configured to process the location information and the charging station information, wherein the controller is configured to, identify whether an information providing condition is satisfied based on the location information and the charging station information, and in response that the information providing condition is satisfied, control the display to display a unique identifier of the vehicle.

16. The system of claim 15, wherein the controller is further configured to:

identify a list of charging stations in a predetermined distance from the vehicle based on the location information of the vehicle and the charging station information, and control the display to display the identified list of the charging stations.

17. The system of claim 16, wherein the controller is further configured to:

identify whether the charging stations support an automatic charging and billing (Plug and Charge: PnC) system based on the unique identifier of the vehicle and the charging station information, and in response that the PnC is supported by the charging stations, control the display to display the unique identifier of the vehicle.

18. The system of claim 17, further including:

an inputter configured to input payment information, wherein the controller is further configured to control the communicator to transmit the payment information received from the inputter and the unique identifier of the vehicle to the external server, and wherein the external server registers the vehicle based on the payment information and the unique identifier of the vehicle.

19. The system of claim 15, wherein the sensor is further configured to obtain battery information of the vehicle, and wherein the controller is further configured to:

identify a drivable distance of the vehicle based on the battery information, and identify a list of charging stations present in the identified drivable distance of the vehicle.

* * * * *